United States Patent
Chang et al.

(10) Patent No.: US 12,332,552 B2
(45) Date of Patent: Jun. 17, 2025

(54) DETACHABLE CAMERA AND OPERATION METHOD THEREOF

(71) Applicant: AVER INFORMATION INC., New Taipei (TW)

(72) Inventors: Chao-Hung Chang, New Taipei (TW); Cheng Cheng Yu, New Taipei (TW); Han-Yen Chang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 125 days.

(21) Appl. No.: 18/140,502

(22) Filed: Apr. 27, 2023

(65) Prior Publication Data

US 2023/0350279 A1  Nov. 2, 2023

(30) Foreign Application Priority Data

Apr. 27, 2022 (TW) .................................. 111116046

(51) Int. Cl.
*G03B 17/56* (2021.01)

(52) U.S. Cl.
CPC .................................. *G03B 17/561* (2013.01)

(58) Field of Classification Search
None
See application file for complete search history.

(56) References Cited

U.S. PATENT DOCUMENTS

| | | | | |
|---|---|---|---|---|
| 5,600,371 A | * | 2/1997 | Arai | H04N 23/663 348/335 |
| 6,124,892 A | * | 9/2000 | Nakano | G08B 13/19632 348/373 |
| 8,221,008 B2 | * | 7/2012 | Kimura | F16M 11/18 396/428 |
| 10,136,035 B2 | | 11/2018 | Pan et al. | |
| 2009/0103778 A1 | * | 4/2009 | Yoshizumi | H04N 23/611 382/103 |
| 2011/0181690 A1 | * | 7/2011 | Yoshizumi | H04N 23/51 348/37 |

(Continued)

FOREIGN PATENT DOCUMENTS

| CN | 112478185 A | 3/2021 |
|---|---|---|
| WO | 2022/064603 A1 | 3/2022 |

OTHER PUBLICATIONS

TW Office Action dated Oct. 6, 2022 as received in Application No. 111116046.

(Continued)

*Primary Examiner* — Rodney E Fuller
(74) *Attorney, Agent, or Firm* — Maschoff Brennan

(57) ABSTRACT

An operation method of a detachable camera, wherein the detachable camera includes a camera body, a camera holder, a driving element and a control circuit, the driving element is controlled by the driving element to control the camera holder, and the operation method, performed by the control circuit, includes: triggered by a trigger signal to determine whether the camera body is on the camera holder, setting a driving current of the driving element as a first current if the camera body is on the camera holder, and setting the driving current of the driving element as a second current if the camera body is not on the camera holder, wherein the second current is lower than the first current.

13 Claims, 7 Drawing Sheets

(56) References Cited

U.S. PATENT DOCUMENTS

| | | | |
|---|---|---|---|
| 2012/0002075 A1* | 1/2012 | Yoshizumi | H04N 23/50 348/E5.037 |
| 2012/0027396 A1* | 2/2012 | Kato | G03B 17/14 396/428 |
| 2023/0292001 A1 | 9/2023 | Niikura et al. | |

OTHER PUBLICATIONS

TW Office Action dated May 14, 2024 as received in Application No. 111116046.

* cited by examiner

DETACHABLE CAMERA AND OPERATION METHOD THEREOF

CROSS-REFERENCE TO RELATED APPLICATIONS

This non-provisional application claims priority under 35 U.S.C. § 119(a) on Patent Application No(s). 111116046 filed in Republic of China (ROC) on Apr. 27, 2022, the entire contents of which are hereby incorporated by reference.

BACKGROUND

1. Technical Field

This disclosure relates to a detachable camera and operation method thereof.

2. Related Art

As video conferences become more and more widespread, in addition to built-in camera lenses such as mobile phones and computers, video cameras have also appeared on the market, which usually include a camera body and a camera holder, allowing users to freely move the camera body at any time, and to capture the desired image in a more convenient way. However, if the motor of the camera holder is maintained at a high driving force after the camera body is removed from the camera holder, the risk of damage to the camera may be increased. In addition, when the camera body is taken out from the camera holder or the camera body is returned to the camera holder, the force and direction of the user when picking up or putting back the camera body varies from person to person, which may easily cause damage or reduced lifespan to the motor of the camera holder.

SUMMARY

Accordingly, this disclosure provides a detachable camera and operation method thereof.

According to one or more embodiment of this disclosure, an operation method of a detachable camera is provided, wherein the detachable camera includes a camera body, a camera holder, a driving element and a control circuit, the driving element is controlled by the driving element to control the camera holder, and the operation method, performed by the control circuit, includes: triggered by a trigger signal to determine whether the camera body is on the camera holder; setting a driving current of the driving element as a first current if the camera body is on the camera holder; and setting the driving current of the driving element as a second current if the camera body is not on the camera holder, wherein the second current is lower than the first current.

According to one or more embodiment of this disclosure, a detachable camera includes: a camera body; a camera holder; a driving element configured to be controlled to control the camera holder; and a control circuit connected to the camera body and the driving element, wherein the control circuit is configured to be triggered by a trigger signal to determine whether the camera body is on the camera holder, set a driving current of the driving element as a first current if the camera body is on the camera holder, and set the driving current of the driving element as a second current if the camera body is not on the camera holder, wherein the second current is lower than the first current.

According to one or more embodiment of this disclosure, a detachable camera includes: a base; a camera holder; a camera body; a driving element; and a control circuit. The camera holder includes: a first part and a second part. The camera holder is rotatably disposed on the base. The camera body is detachably installed on the camera holder. The driving element includes a first motor and a second motor. The control circuit is electrically connected to the first motor and the second motor. The control circuit is configured to control the first motor to drive the first part to rotate with respect to the base with a first axis as a rotation axis, and configured to control the second motor to drive the second part to rotate with respect to the first part with a second axis as a rotation axis.

In view of the above description, the detachable camera and operation method thereof according to one or more embodiments of the present disclosure may lower the power consumption of the detachable camera and damage to the driving element (for example, the motor) caused by strong force or improper take-out direction of the user may be avoided by lowering the driving current when the camera body is not on the camera holder, thereby extending the lifespan of the detachable camera.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1A:
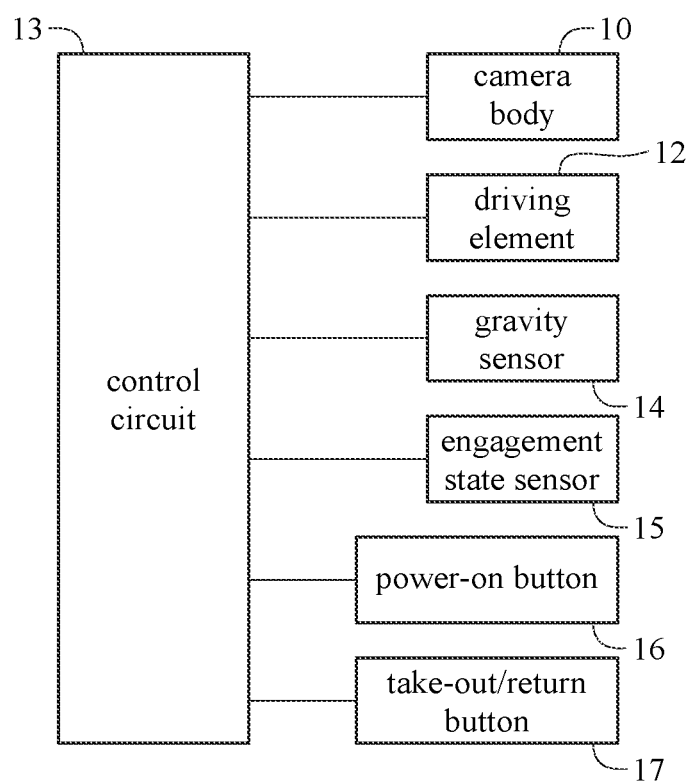
FIG. 1A is a block diagram illustrating a detachable camera according to an embodiment of the present disclosure.
Figure 1B:
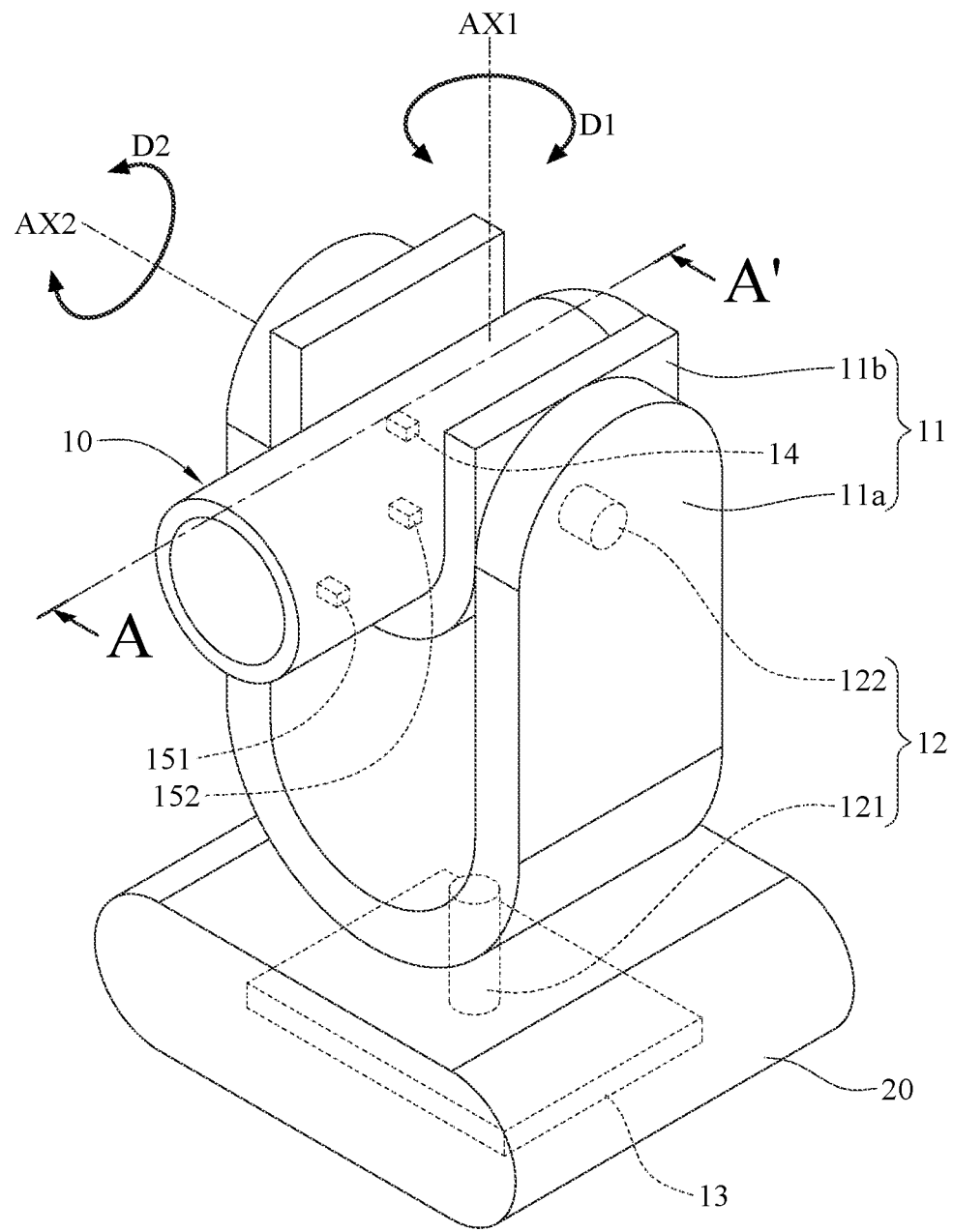
FIG. 1B is a stereo schematic diagram illustrating the detachable camera.

Please refer to FIG. 1A and FIG. 1B, wherein FIG. 1A is a block diagram illustrating a detachable camera according to an embodiment of the present disclosure, and FIG. 1B is a stereo schematic diagram illustrating the detachable camera. As shown in FIG. 1A and FIG. 1B, the detachable camera 1 of the present disclosure includes a camera body 10, a camera holder 11, a driving element 12, a control circuit 13, a gravity sensor (G sensor) 14, an engagement state sensor 15, a power-on button 16 and a take-out/return button 17. The driving element 12 may be controlled by the control circuit 13 to control the camera holder 11, such as controlling the camera holder 11 to rotate along a pan direction or a tilt direction, or controlling the camera holder 11 to stay at a particular position. The control circuit 13 may be disposed in a base 20 and electrically connected to the driving element 12, and electrically connected to or in communication connection with the camera body 10, the G sensor 14, the engagement state sensor 15, the power-on button 16 and the take-out/return button 17. The G sensor 14 and the engagement state sensor 15 are installed on the camera body 10 to generate sensing signal associated with the camera body 10. Further, the engagement state sensor 15 may be a pressure sensor or a magnetic sensor, and the number of the engagement state sensor 15 may be one or more. The power-on button 16 is configured to allow the user to activate the detachable camera 1. The take-out/return button 17 is configured to be pushed by the user when attempting to take the camera body 10 out from the camera holder 11 (detach the camera body 10) or putting the camera body 10 back to the camera holder 11. The control circuit 13 may be triggered by a trigger signal associated with the power-on button 16 or the take-out/return button 17 to perform a return determination procedure according to the sensing signal, thereby determining whether the camera body 10 is on the camera holder 11.

As shown in FIG. 1B, the driving element 12 may include a first motor 121 and a second motor 122, wherein the first motor 121 and the second motor 122 may both be stepper motors. Specifically, the camera holder 11 includes a first part 11a (the bigger "U" shaped part) and a second part 11b (the smaller "U" shaped part). The first part 11a is pivoted at the base 20 through the first motor 121; and the second part 11b is pivoted at the first part 11a through the second motor 122. More specifically, the first part 11a is pivoted at the base 20 through an output shaft of the first motor 121, and the second part 11b is pivoted at the first part 11a through an output shaft of the second motor 122. As shown in FIG. 1B, the rotation of the pan direction described above may be a rotation direction D1 with a first axis AX1 as the rotation axis, and the tilt direction described above may be a rotation direction D2 with a second axis AX2 as the rotation axis. The movement of the first part 11a at the rotation direction D1 is driven by the first motor 121, and the movement of the second part 11b at the rotation direction D2 is driven by the second motor 122. Specifically, the first axis AX1 and the second axis AX2 may be orthogonal. The detachable camera 1 may include two engagement state sensors, which are the pressure sensor 151 and the magnetic sensor 152, respectively. Specifically, the pressure sensor 151 is disposed on a mechanical switch for engaging (clipping) the camera body 10 and the camera holder 11 to sense pressure generated when the mechanical switch is pressed. The magnetic sensor 152 is attached to a motor board inside the camera body 10, and a corresponding magnetic element is attached to the camera holder 11. The magnetic sensor 152 is configured to sense magnetic force generated by the magnetic element when the camera body 10 and the camera holder 11 are getting closer to each other. Said motor board is a circuit board disposed with one or more motor drivers for zooming in and auto focus (AF). In particular, the G sensor 14, the engagement state sensor 15 and the take-out/return button 17 are elements selectively disposed, and the detachable camera 1 may be disposed with only one of the pressure sensor 151 and the magnetic sensor 152.

Figure 1C:
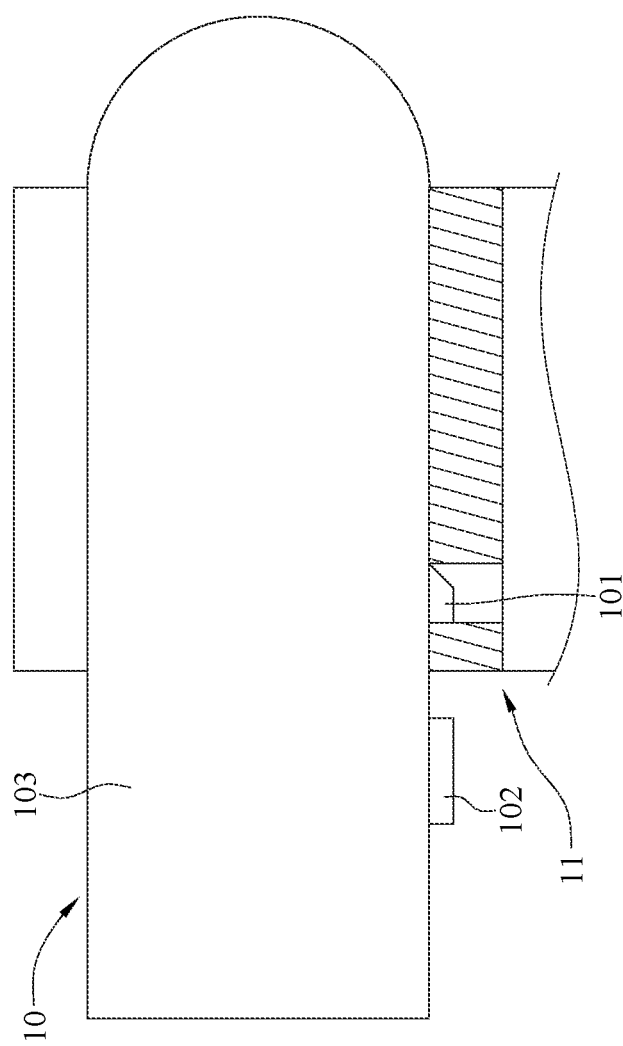
FIG. 1C is a cross-sectional diagram of the camera body and a part of the camera holder along line A-A' shown in FIG. 1B.

Please refer to FIG. 1C, wherein FIG. 1C is a cross-sectional diagram of the camera body and a part of the camera holder along line A-A' shown in FIG. 1B. The "detachable" of the present disclosure indicates that the camera body 10 can be taken out from the camera holder 11. Specifically, the camera body 10 includes an expandable component 101, an engagement button 102 and a main part 103, wherein the expandable component 101 and the engagement button 102 are disposed at the main part 103. When the engagement button 102 is pushed, the expandable component 101 retracts toward the inside of the main part 103 of the camera body 10 for the camera body 10 to be taken out from the camera holder 11, and thereby detached from the camera holder 11.

Figure 2:
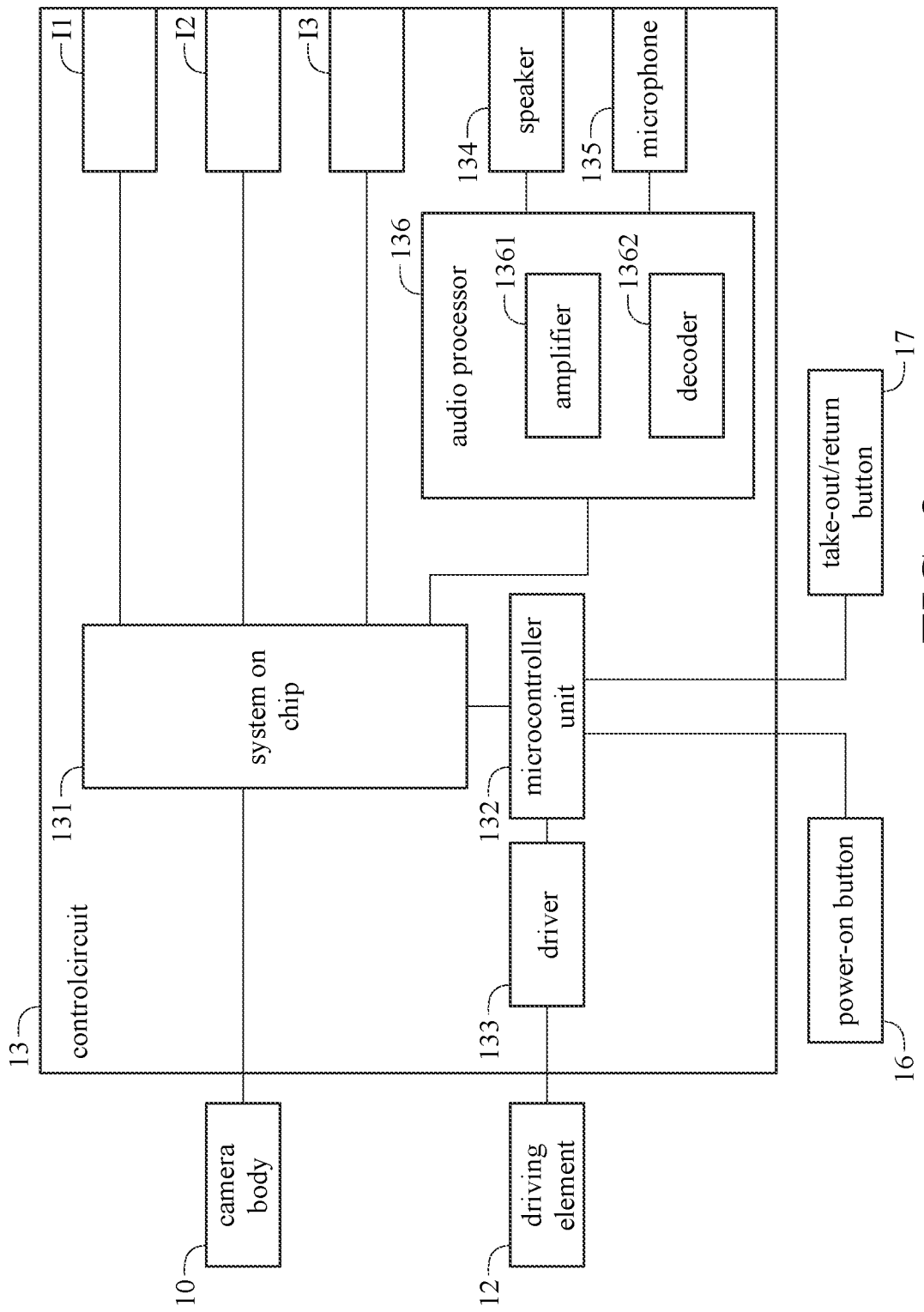
FIG. 2 is a block diagram illustrating a circuit structure of the control circuit according to an embodiment of the present disclosure.

Moreover, please refer to FIG. 2, wherein FIG. 2 is a block diagram illustrating a circuit structure of the control circuit according to an embodiment of the present disclosure. The control circuit 13 may include a system on chip (SoC) 131, a microcontroller unit (MCU) 132, a driver 133, a speaker 134, a microphone 135, an audio processor 136, a first connection interface I1, a second connection interface I2 and a third connection interface I3, wherein the audio processor 136 includes an amplifier 1361 and a decoder 1362. The amplifier 1361 is, for example, a D- the amplifier; the decoder 1362 is, for example, a codec; the first connection interface I1, the second connection interface I2 and the third connection interface I3 may be a universal serial bus (USB), a local area network (LAN) interface and a high-definition multimedia interface (HDMI). The SoC 131 is electrically connected to the camera body 10, the MCU 132, the audio processor 136, the first connection interface I1, the second connection interface I2 and the third connection interface I3. The MCU 132 is electrically connected to the SoC 131, the driver 133, the power-on button 16 and the take-out/return button 17. The driver 133 is electrically connected to the driving element 12.

The MCU 132 is configured to transmit the trigger signals generated when the power-on button 16 and the take-out/return button 17 are pushed to the SoC 131. When the SoC 131 receives the trigger signal of the power-on button 16, the SoC 131 performs the return determination procedure and controls electrical power inputted from the driver 133 to the driving element 12 according to the result of the return determination procedure, to set the driving current that controls the driving element 12. Further, when the SoC 131 receives the trigger signal of the take-out/return button 17, the SoC 131 performs a driving current determination procedure, and selectively performs the return determination procedure. The details of the procedures are described below. In another embodiment, the control circuit 13 may not include the MCU 132, and the SoC 131 is directly electrically connected to the driver 133, the power-on button 16 and the take-out/return button 17. The SoC 131 is configured to perform the return determination procedure after receiving the trigger signal generated when the power-on button 16 is pushed, set the driving current that controls the driving element 12, perform the driving current determination procedure after receiving the trigger signal which is generated when the take-out/return button 17 is pushed, and selectively perform the return determination procedure. In addition, the control circuit 13 may be disposed with, for example, a power connector of a direct current connector (DC jack), which is configured to provide power to the detachable camera 1. It should be noted that, the driving current of the driving element 12 described herein refers to the current for driving both the first motor 121 and the second motor 122.

Figure 3:
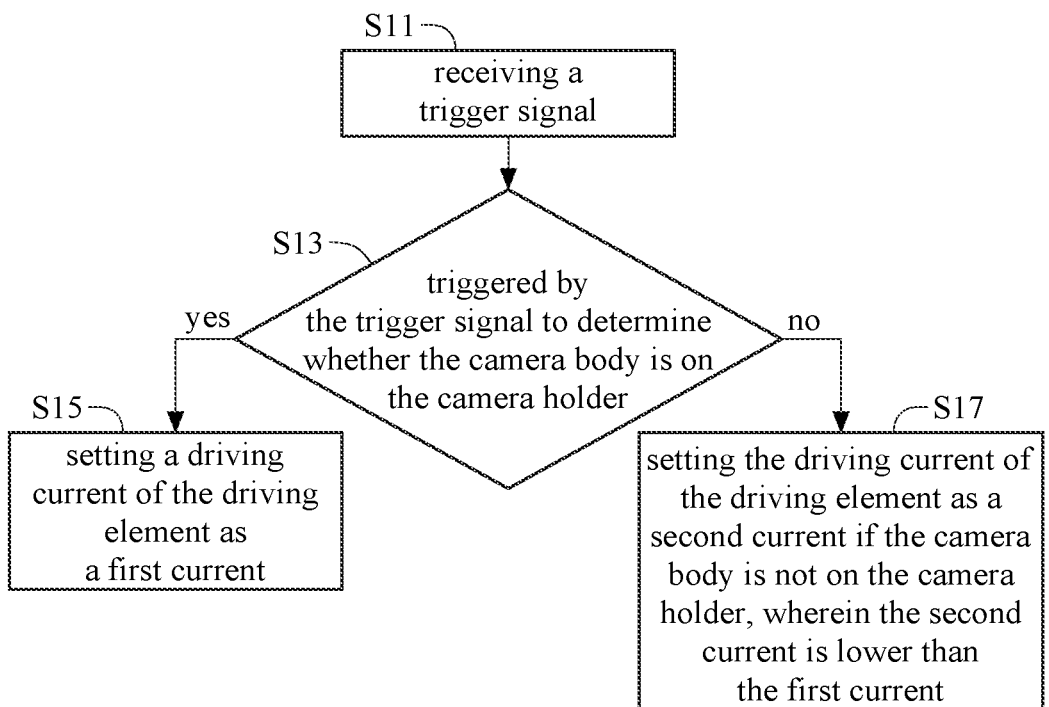
FIG. 3 is a flowchart illustrating an operation method of detachable camera according to an embodiment of the present disclosure.

Please refer to FIG. 1A, FIG. 1B and FIG. 3, wherein FIG. 3 is a flowchart illustrating an operation method of detachable camera according to an embodiment of the present disclosure. The operation method of the detachable camera 1 of the present disclosure may be performed by the control circuit 13. As shown in FIG. 3, the operation method of the detachable camera 1 includes step S11 to step S17.

In steps S11 and S13, the control circuit 13 may be triggered by the trigger signal to determine whether the camera body 10 is engaged (seated) on the camera holder 11, thereby determining the method of setting the driving current for controlling the driving element 12, wherein the determination of whether the camera body 10 is engaged on the camera holder 11 may be referred to as the return determination procedure, which is described below. In an implementation, the trigger signal is a signal generated when the power-on button 16 is triggered (i.e. the power-on signal). In another implementation, the trigger signal is a signal generated when the take-out/return button 17 is triggered and that the control circuit 13 determines that the driving current of the driving element 12 is a second current.

In step S15, if the camera body 10 is engaged on the camera holder 11, the control circuit 13 may set the driving current of the driving element 12 as a first current; and in step S17, if the camera body 10 is not engaged on the camera holder 11, the control circuit 13 may set the driving current of the driving element 12 as the second current, which is lower than the first current. The first current is, for example, 10 milliampere (mA), and the second current is, for example, 1 mA. Accordingly, by lowering the driving current when the camera body 10 is not engaged on the camera holder 11, the power consumption of the detachable camera 1 may be lowered.

In another embodiment, after the control circuit 13 is trigged by the trigger signal generated by the power-on button 16 and before determining whether the camera body 10 is engaged on the camera holder 11, the control circuit 13 may perform a camera correction procedure on the camera holder 11, wherein the camera correction procedure includes: activating the driving element 12 to control the first part 11a of the camera holder 11 to rotate left and right at a translation angle of 170 degrees with respect to the base 20, and to control the second part 12a of the camera holder 11 to rotate up and down at a tilt angle of 90 degrees with respect to the first part 11a to make sure that the camera holder 11 has a normal rotatable range. After completing the camera correction procedure, the control circuit 13 may control the camera holder 11 to rotate to an initial position of, for example, the translation angle and the tilt angle both being 0 degree. By making sure that the camera holder 11 has a normal rotatable range and by rotating the camera holder 11 back to the initial position, the result of the return determination procedure may be more accurate. In particular, in the camera correction procedure, the control circuit 13 controls the driving current of the driving element 12 to be the first current, and the following step S15 may be regarded as maintaining the state of the driving element 12, and step S17 may be regarded as switching the state of the driving element 12.

Figure 4A:
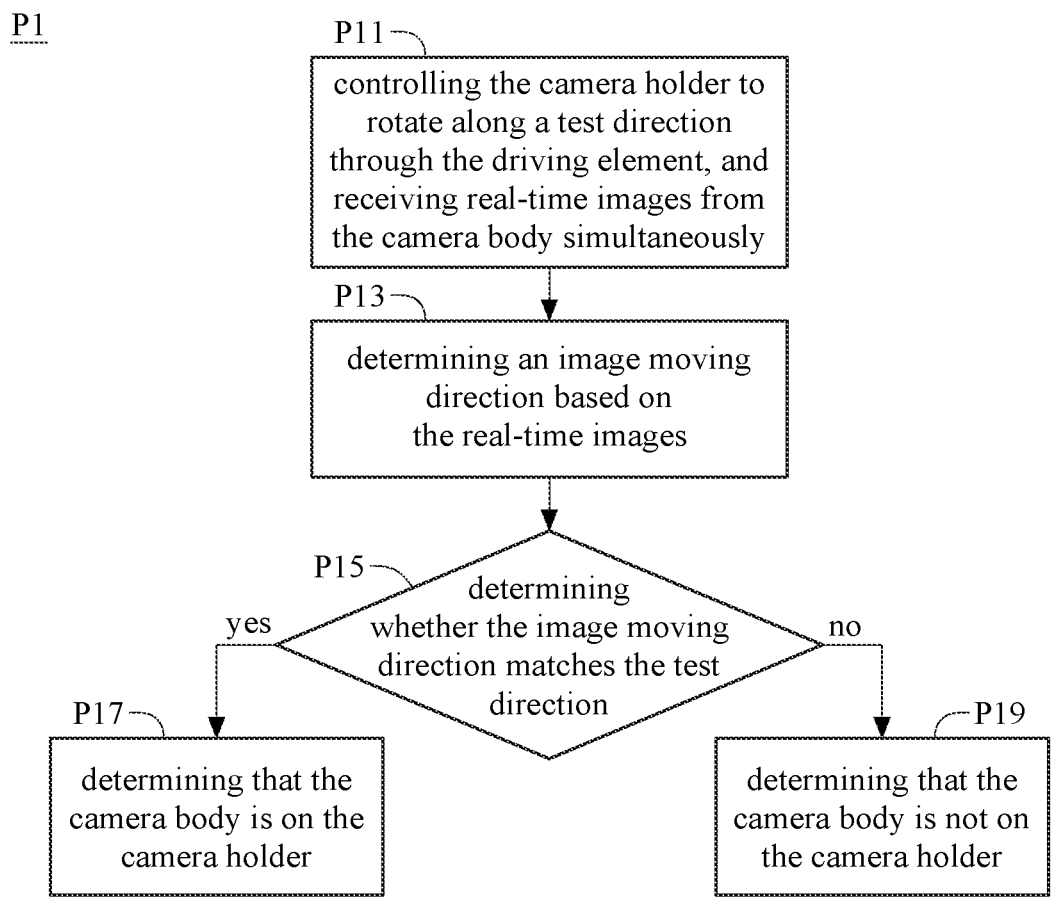
FIGS. 4A, 4B and 4C are flowcharts illustrating a return determination procedure according to embodiments of the present disclosure.

Please refer to FIG. 1A and FIG. 4A, wherein FIG. 4A is a flowchart illustrating a return determination procedure according to an embodiment of the present disclosure. The return determination procedure P1 of FIG. 4A may be applied to the detachable camera 1 shown in FIG. 1A, the return determination procedure P1 may also be applied to the detachable camera shown in FIG. 1A only without the G sensor 14 and the engagement state sensor 15. The return determination procedure P1 of determining whether the camera body 10 is engaged on the camera holder 11 may be performed by the control circuit 13. As shown in FIG. 4A, the return determination procedure P1 includes step P11 to step P19.

The test direction described in step P11 includes the pan direction and the tilt direction of the camera holder 11 controlled by the driving element 12, such as the rotation direction D1 and the tilt direction D2 shown in FIG. 1B. The real-time images that the control circuit 13 received from the camera body 10 are images captured during the process of the camera holder 11 rotating along the test direction. Then, in step P13, the control circuit 13 determines the image moving direction according to the real-time images, wherein the image moving direction represents the moving direction of the camera body 10 during the process of the camera holder 11 rotating along the test direction. The control circuit 13 may determine the image moving direction using a background subtraction method, a temporal difference method, an optical flow method, a Harris corner detection method etc. In step P15, the control circuit 13 determines whether the image moving direction matches the test direction. If the determination result of step P15 is "yes", the control circuit 13 determines that the camera body 10 is engaged on the camera holder 11 in step P17; if the determination result of step P15 is "no", the control circuit 13 determines that the camera body 10 is not engaged on the camera holder 11 in step P19. In other words, if the image moving direction matches the test direction, it means that when the camera holder 11 rotates along the test direction, the camera body 10 is engaged on the camera holder 11 and is accordingly moved by the camera holder 11; on the contrary, if the image moving direction does not match the test direction, it means that when the camera holder 11 rotates along the test direction, the camera body 10 is not engaged on the camera holder 11 and is not moved by the camera holder 11.

Figure 4B:
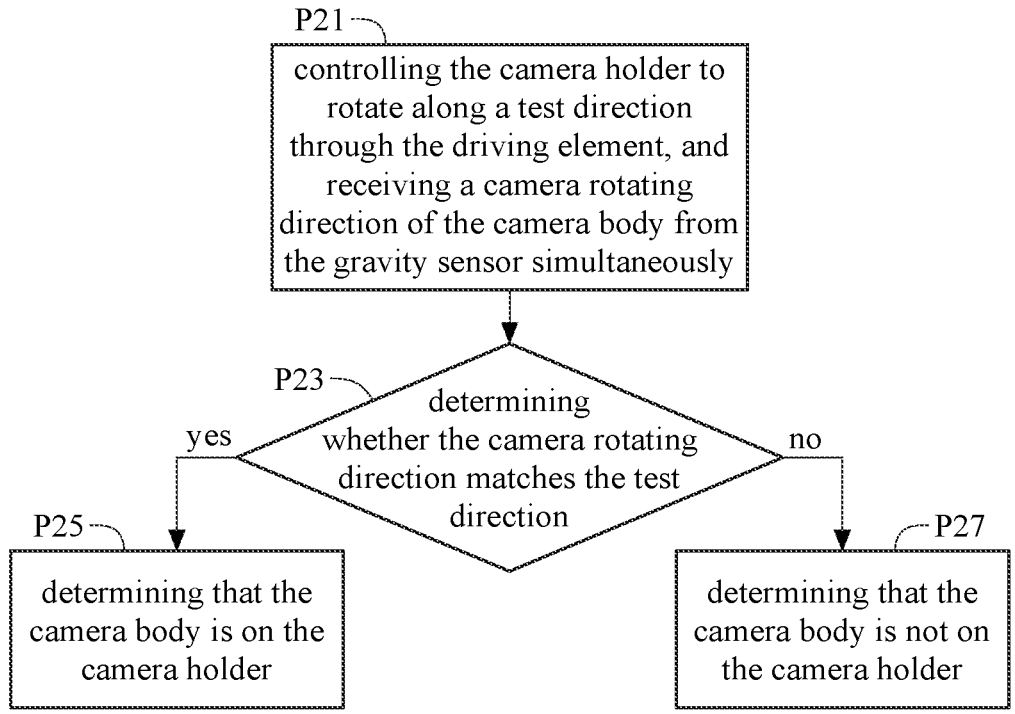

Please refer to FIG. 1A, FIG. 1B and FIG. 4B, wherein FIG. 4B is a flowchart illustrating a return determination procedure according to another embodiment of the present disclosure. The return determination procedure P2 of FIG. 4B may be applied to the detachable camera 1 shown in FIG. 1A, the return determination procedure P2 may also be applied to the detachable camera shown in FIG. 1A without the engagement state sensor 15. The return determination procedure P2 of determining whether the camera body 10 is engaged on the camera holder 11 may be performed by the control circuit 13. As shown in FIG. 4B, the return determination procedure P2 includes step P21 to step P27.

In step P21, the test direction includes the pan direction and the tilt direction of the camera holder 11 controlled by the control circuit 13 through the driving element 12, and a camera rotating direction is the result of the G sensor 14 sensing the camera body 10 during the rotation of the camera holder 11 along the test direction. Then, in step P23, the control circuit 13 determines whether the camera rotating direction matches the test direction. If the determination result of step P23 is "yes", the control circuit 13 determines that the camera body 10 is engaged on the camera holder 11 in step P25; and if the determination result of step P23 is "no", the control circuit 13 determines that the camera body 10 is not engaged on the camera holder 11 in step P27. In other words, if the camera rotating direction matches the test direction, it means that when the camera holder 11 rotates along the test direction, the camera body 10 is on the camera holder 11 and is moved by the camera holder 11 accordingly; on the contrary, if the camera rotating direction does not match the test direction, it means that during the rotation of the camera holder 11 along the test direction, the camera body 10 is not engaged on the camera holder 11 and is not moved by the camera holder 11.

Figure 4C:
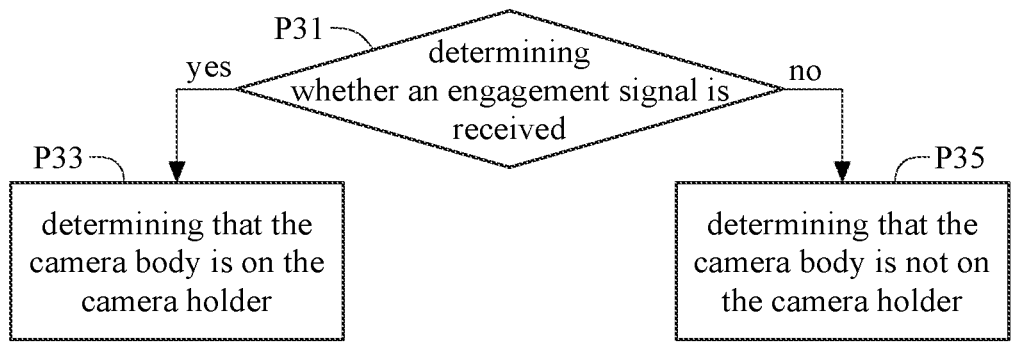

Please refer to FIG. 1A, FIG. 1B and FIG. 4C, wherein FIG. 4C is a flowchart illustrating a return determination procedure according to yet another embodiment of the present disclosure. The return determination procedure P3 of FIG. 4C may be applied to the detachable camera 1 shown in FIG. 1A, the return determination procedure P3 may also be applied to the detachable camera shown in FIG. 1A without the G sensor 14. The return determination procedure P3 of determining whether the camera body 10 is engaged on the camera holder 11 may be performed by the control circuit 13. As shown in FIG. 4C, the return determination procedure P3 includes step P31 to step P35: if an engagement signal is not received, the camera body is determined to be not engaged on the camera holder.

It should be noted that, in the implementation of the engagement state sensor 15 is the pressure sensor 151, the engagement signal is a pressure signal generated by the pressure sensor 151 when the mechanical switch (the expandable component 101 shown in FIG. 1C) for engaging the camera body 10 with the camera holder 11 is pushed; in the implementation of the engagement state sensor 15 is the magnetic sensor 152, the engagement signal is a magnetic signal generate by the magnetic sensor 152 when the magnetic element is sensed. Since the engagement signals generated by the pressure sensor 151 and the magnetic sensor 152 are only generated when the camera body 10 is engaged to the camera holder 11, in the return determination procedure P3, the control circuit 13 determines whether the camera body 10 is engaged on the camera holder 11 by determining whether the engagement signal is received from the engagement state sensor 15.

In addition, in the embodiment of the detachable camera 1 including both the G sensor 14 ad the engagement state sensor 15, the control circuit 13 may determine that the camera body 10 is engaged on the camera holder 11 when the following three conditions are met: the image moving direction matches the test direction; the camera rotating direction matches the test direction; and the engagement signal is received. The control circuit 13 may also determine that the camera body 10 is engaged on the camera holder 11 when two of the three conditions are met. Therefore, even if one of the camera body 10, the G sensor 14 and the engagement state sensor 15 is broken, the return determination procedure may still be performed.

Figure 5:
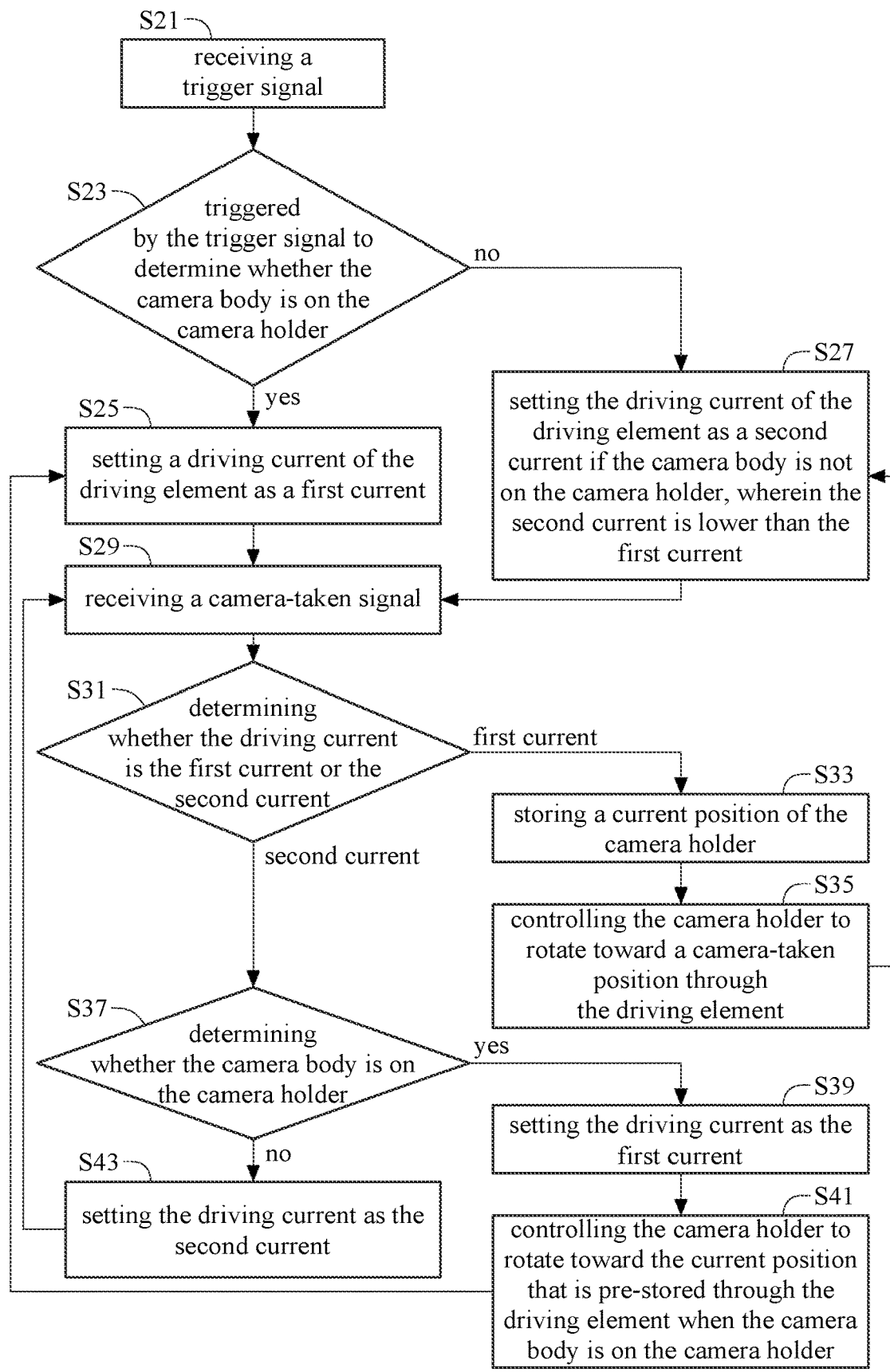
FIG. 5 is a flowchart illustrating an operation method of detachable camera according to another embodiment of the present disclosure.

Please refer to FIG. 1A and FIG. 5, wherein FIG. 5 is a flowchart illustrating an operation method of detachable camera according to another embodiment of the present disclosure. The operation method of the detachable camera 1 of the present disclosure may be performed by the control circuit 13. As shown in FIG. 5, the operation method of the detachable camera 1 may include step S21 to step S43. The power-on signal described in step S21 of FIG. 5 is the trigger signal described in step S11 of FIG. 3. Steps S21, S23, S25 and S27 of FIG. 5 are the same as steps S11, S13, S15 and S17 of FIG. 3, respectively, and their descriptions are omitted herein.

After setting the driving current for controlling the driving element 12, when the control circuit 13 receives a camera-taken signal from the take-out/return button 17 (step S29), it means that the user is attempting to take out the camera body 10 from the camera holder 11 or put back the camera body 10. The control circuit 13 may first determine whether the driving current at the moment is the first current or the second current (step S31) to determine whether the camera body 10 is engaged on the camera holder 11. When the determination result of step S31 is the first current, it means that the camera body 10 is engaged on the camera holder 11, and the camera-taken signal indicates that the user is attempting to take out the camera body 10 from the camera holder 11. The control circuit 13 may store a current position of the camera holder 11 (step S33), wherein the current position may include a current angle of the camera holder 11 at the pan direction and a current angle of the camera holder 11 at the tilt direction. The control circuit 13 may further store a current zoom-in scale of the camera body 10. Then, the control circuit 13 activates the driving element 12 to control the camera holder 11 to rotate to a take-out position suitable for the user to take out the camera body 10 (step S35) and lower the driving current of the driving element 12 to the second current (step S27), wherein the take-out position is, for example, a position with translation angle of 0 degree and tilt angle of 90 degrees. Accordingly, when the user takes out the camera body 10 from the camera holder 11, the damage to the driving element 12 caused by strong force or improper take-out direction of the user may be avoided.

When the determination result of step S31 is the second current, it means that the camera body 10 is not engaged on the camera holder 11, and the camera-taken signal indicates that the user is attempting to put the camera body 10 back onto the camera holder 11. Therefore, the control circuit 13 may perform the return determination procedure to determine whether the camera body 10 is put back to the camera holder 11 (step S37). The return determination procedure may be one or more of the return determination procedures P1-P3 shown in FIG. 4A, FIG. 4B and FIG. 4C. If the determination result of step S37 is "yes", it means that the user has already put the camera body 10 back onto the camera holder 11, the control circuit 13 may set the driving current for controlling the driving element 12 as the first current (step S39), and control the camera holder 11 to rotate to the pre-stored position (step S41), wherein the pre-stored position may be a default position or the current position stored in step S33. The control circuit 13 may further set the zoom-in scale of the camera body 10 as the current zoom-in scale stored in step S33. If the determination result of step S37 is "no", it means that the user has not yet put the camera body 10 back onto the camera holder 11, the control circuit 13 may set the driving current for controlling the driving element 12 as the second current (step S43). Accordingly, when the camera body 10 has been returned to the camera holder 11, the camera body 10 may be rotated to the position that is previously set by the user, so that the user does not need to manually adjust the position of the camera body 10 to the previously set position after putting the camera body 10 back onto the camera holder 11.

In still another embodiment, if the switch used to engage the camera body 10 with the camera holder 11 is an electronic switch and is connected to the control circuit 13, then after step S39 is performed, the control circuit 13 may further control the electronic switch to unlock. In addition, after step S3, the control circuit 13 may perform the camera correction procedure described above on the camera holder 11 to make sure that the camera holder 11 has a normal rotatable range. In particular, in the camera correction procedure, the driving current of the driving element 12 controlled by the control circuit 13 is the first current, and step S39 may be regarded as switching the state of the driving element 12, and step S43 may be regarded as maintaining the state of the driving element 12.

It should be noted that, the embodiment of FIG. 5 shows that the control circuit 13 performs step S29 after performing steps S25, S27 and S43, which means that the control circuit 13 waits for the camera-taken signal after performing steps S25, S27 and S43. Specifically, when the user pushes the take-out/return button 17, the control circuit 13 receives the camera-taken signal (i.e. step S29).

In view of the above description, the detachable camera and operation method thereof according to one or more embodiments of the present disclosure may lower the power consumption of the detachable camera, and damage to the driving element (for example, the motor) caused by strong force or improper take-out direction of the user may be avoided by lowering the driving current when the camera body is not on the camera holder, thereby extending the lifespan of the detachable camera. In addition, the detachable camera and operation method thereof according to one or more embodiments of the present disclosure may allow the user to not manually adjust the position of the camera body to the previously set position after putting the camera body back onto the camera holder when the camera body is put back to the camera holder by rotating the camera body back to the previously set position.

What is claimed is:

1. An operation method of a detachable camera, wherein the detachable camera comprises a camera body, a camera holder, a driving element and a control circuit, the driving element is controlled by the driving element to control the camera holder, and the operation method, performed by the control circuit, comprises:
    triggered by a trigger signal to determine whether the camera body is on the camera holder;
    setting a driving current of the driving element as a first current if the camera body is on the camera holder; and
    setting the driving current of the driving element as a second current if the camera body is not on the camera holder, wherein the second current is lower than the first current.

2. The operation method according to claim 1, wherein determining whether the camera body is on the camera holder comprises:
    controlling the camera holder to rotate along a test direction through the driving element, and receiving a plurality of real-time images from the camera body simultaneously;
    determining an image moving direction based on the plurality of real-time images;
    determining whether the image moving direction matches the test direction;
    determining that the camera body is on the camera holder if the image moving direction matches the test direction; and
    determining that the camera body is not on the camera holder if the image moving direction does not match the test direction.

3. The operation method according to claim 1, wherein a gravity sensor is disposed on the camera body and is connected to the control circuit, and determining whether the camera body is on the camera holder comprises:
    controlling the camera holder to rotate along a test direction through the driving element, and receiving a camera rotating direction of the camera body from the gravity sensor simultaneously;
    determining whether the camera rotating direction matches the test direction;
    determining that the camera body is on the camera holder if the camera rotating direction matches the test direction; and
    determining that the camera body is not on the camera holder if the camera rotating direction does not match the test direction.

4. The operation method according to claim 1, wherein an engagement state sensor is disposed on the camera body and is configured to generate a engagement signal between the camera body and the camera holder, the engagement state sensor is connected to the control circuit, and determining whether the camera body is on the camera holder comprises:
    determining whether the engagement signal is received;
    determining that the camera body is on the camera holder if the engagement signal is received; and
    determining that the camera body is not on the camera holder if the engagement signal is not received.

5. The operation method according to claim 1, wherein the trigger signal is a power-on signal, and the method further comprises:
    receiving a camera-taken signal;
    determining whether the driving current is the first current or the second current;
    storing a current position of the camera holder when the driving current is the first current;
    controlling the camera holder to rotate toward a camera-taken position through the driving element; and
    setting the driving current as the second current.

6. The operation method according to claim 1, wherein the trigger signal is a power-on signal, and the method further comprises:
    receiving a camera-taken signal;
    determining whether the driving current is the first current or the second current;
    determining whether the camera body is on the camera holder when the driving current is the second current;
    controlling the camera holder to rotate toward a current position that is pre-stored through the driving element when the camera body is on the camera holder; and
    setting the driving current as the first current.

7. A detachable camera, comprising:
    a camera body;
    a camera holder;
    a driving element configured to be controlled to control the camera holder; and
    a control circuit connected to the camera body and the driving element, wherein the control circuit is configured to be triggered by a trigger signal to determine whether the camera body is on the camera holder, set a driving current of the driving element as a first current if the camera body is on the camera holder, and set the driving current of the driving element as a second current if the camera body is not on the camera holder, wherein the second current is lower than the first current.

8. The detachable camera according to claim 7, wherein the control circuit performs determining whether the camera body is on the camera holder comprises:
    controlling the camera holder to rotate along a test direction through the driving element, and receiving a plurality of real-time images from the camera body simultaneously;
    determining an image moving direction based on the plurality of real-time images;

determining whether the image moving direction matches the test direction;

determining that the camera body is on the camera holder if the image moving direction matches the test direction; and determining that the camera body is not on the camera holder if the image moving direction does not match the test direction.

9. The detachable camera according to claim 7, further comprising a gravity sensor disposed on the camera body and connected to the control circuit, and the gravity sensor configured to sense a camera rotating direction of the camera body, wherein the control circuit performs determining whether the camera body is on the camera holder comprises:

controlling the camera holder to rotate along a test direction through the driving element, and receiving the camera rotating direction of the camera body from the gravity sensor simultaneously;

determining whether the camera rotating direction matches the test direction;

determining that the camera body is on the camera holder if the camera rotating direction matches the test direction; and determining that the camera body is not on the camera holder if the camera rotating direction does not match the test direction.

10. The detachable camera according to claim 7, further comprising an engagement state sensor disposed on the camera body and connected to the control circuit, the engagement state sensor configured to generate an engagement signal between the camera body and the camera holder, wherein determining whether the camera body is on the camera holder comprises:

determining whether the engagement signal is received;

determining that the camera body is on the camera holder if the engagement signal is received; and determining that the camera body is not on the camera holder if the engagement signal is not received.

11. The detachable camera according to claim 7, wherein the trigger signal is a power-on signal, and the control circuit is further configured to receive a camera-taken signal, determine whether the driving current is the first current or the second current, store a current position of the camera holder when the driving current is the first current, control the camera holder to rotate toward a camera-taken position through the driving element, and set the driving current as the second current.

12. The detachable camera according to claim 7, wherein the trigger signal is a power-on signal, and the control circuit is further configured to receive a camera-taken signal, determine whether the driving current is the first current or the second current, determe whether the camera body is on the camera holder when the driving current is the second current, control the camera holder to rotate toward a current position that is pre-stored through the driving element when the camera body is on the camera holder, and set the driving current as the first current.

13. A detachable camera, comprising:

a base;

a camera holder rotatably disposed on the base;

a camera body detachably installed on the camera holder;

a driving element comprising a first motor and a second motor; and a control circuit electrically connected to the first motor and the second motor, wherein the camera holder comprises:

a first part disposed at the base through the first motor; and a second part disposed at the first part through the second motor;

wherein the control circuit is configured to control the first motor to drive the first part to rotate with respect to the base with a first axis as a rotation axis, and configured to control the second motor to drive the second part to rotate with respect to the first part with a second axis as a rotation axis, wherein the camera body comprises a main part, an expandable component and an engagement button, the expandable component and the engagement button are disposed at the main part, and the expandable component retracts toward the inside of the main part when the engagement button is pushed, for the camera body is detached from the camera holder.

* * * * *